(12) United States Patent
Nielsen et al.

(10) Patent No.: US 7,229,144 B2
(45) Date of Patent: Jun. 12, 2007

(54) METHOD FOR ALIGNING MULTIPLE NOZZLE MEMBERS IN A SOLID FREE FORM FABRICATION TOOL

(76) Inventors: Jeffrey Allen Nielsen, 4553 NW. Elmwood Dr., Corvallis, OR (US) 97330; Steven T. Castle, 811 Pioneer St., Philomath, OR (US) 97370; David C Collins, 581 Canberra, Philomath, OR (US) 97370

( * ) Notice: Subject to any disclaimer, the term of this patent is extended or adjusted under 35 U.S.C. 154(b) by 216 days.

(21) Appl. No.: 10/285,724

(22) Filed: Oct. 31, 2002

(65) Prior Publication Data
US 2004/0085377 A1    May 6, 2004

(51) Int. Cl.
*B41J 3/00* (2006.01)
*B28B 1/32* (2006.01)

(52) U.S. Cl. ............... 347/2; 264/308; 264/40.1; 700/118; 700/119; 700/123

(58) Field of Classification Search .......... 347/1, 347/19, 40, 2; 156/58, 59, 64, 155, 344; 56/350; 428/313.3, 313.5; 430/324; 700/118, 700/119, 120, 123; 427/9, 10; 118/313, 118/713; 264/308, 40.1
See application file for complete search history.

(56) References Cited

U.S. PATENT DOCUMENTS

| | | | |
|---|---|---|---|
| 4,915,757 A | 4/1990 | Rando | |
| 5,136,515 A * | 8/1992 | Helinski | 700/119 |
| 5,216,616 A * | 6/1993 | Masters | 264/401 |
| 5,276,467 A | 1/1994 | Meyer et al. | 347/19 |
| 5,350,929 A | 9/1994 | Meyer et al. | 250/573 |
| 5,402,351 A * | 3/1995 | Batchelder et al. | 700/119 |
| 5,408,746 A | 4/1995 | Thoman et al. | 29/890.1 |
| 5,594,652 A | 1/1997 | Penn et al. | |
| 5,600,350 A | 2/1997 | Cobbs et al. | 347/19 |
| 5,617,128 A | 4/1997 | Thoman et al. | 347/87 |
| 5,646,655 A | 7/1997 | Iwasaki et al. | 347/14 |
| 5,812,156 A | 9/1998 | Bullock et al. | 347/19 |
| 5,856,833 A | 1/1999 | Elgee et al. | 347/19 |
| 2002/0081503 A1* | 6/2002 | Kawase et al. | 430/7 |
| 2002/0104973 A1* | 8/2002 | Kerekes | 250/559.2 |

FOREIGN PATENT DOCUMENTS

EP    0875379 A2    11/1998

* cited by examiner

*Primary Examiner*—Julian D. Huffman

(57) ABSTRACT

A method for aligning multiple nozzle members in a solid free form build unit is disclosed. A geometric test shape having at least one investigational topographic region projecting outward from a central base is formed and analyzed for at least one physical characteristic correlative with nozzle member targeting accuracy. The physical characteristic is at least one of color hue shift, surface pattern irregularity, and dimensional accuracy.

39 Claims, 6 Drawing Sheets

METHOD FOR ALIGNING MULTIPLE NOZZLE MEMBERS IN A SOLID FREE FORM FABRICATION TOOL

FIELD OF THE INVENTION

The present invention relates to solid free form fabrication methods. More specifically, the present invention relates to solid free form fabrication methods using materials deposited from at least two discrete deposition devices and methods for aligning the discrete deposition devices to ensure targeting accuracy.

BACKGROUND OF THE INVENTION

Solid free form fabrication (SFF) technology builds an object of any complex shape or geometry without requiring pre-shaped tools such as dies or molds. SFF technology can be used to produce a variety of complex three-dimensional objects quickly and efficiently. In order to optimize production speed to accommodate rapid production and/or larger sized products, solid free form production devices have been proposed and employed which have multiple dispensing units such as nozzle members suitably integrated together.

Multiple dispensing units such as nozzle members present in a single device can present challenges if it becomes necessary to scale or add more dispensing units to further increase speed, size, etc. Additionally, solid free form dispensing systems in which dispensing members are present in one unit make it challenging to design a system in which different dispensing members dispense material with different properties such as color, hardness, strength, etc. Solid free form systems in which the dispensing members are present on one unit can also necessitate the replacement of an entire unit if even a small number of nozzles on the member cease to function. Thus, it is highly desirable to provide a solid free form dispensing system having multiple dispensing members which can be activated as needed or required.

When multiple dispensing member solid free form systems are employed, proper alignment of the dispensing member(s) is necessary to provide an acceptable deposition pattern. Improper deposition patterns due to misalignment of dispensing member(s) can result in undesirable characteristics in the resulting solid free form product. These can include, but are not limited to dimensional inaccuracy, unacceptable surface finish, color inaccuracy or discontinuity and/or deficiencies in part integrity.

Alignment methods and alignment validation systems previously employed with solid free-form devices and techniques required significant manipulation and visual inspection of multiple test pieces. Alignment methods and verification systems which are more amenable to automated processes and/or could permit rapid precision inspection and system validation would be valuable.

SUMMARY OF THE INVENTION

Disclosed is a method and device for producing a solid free-form article having at least one physical characteristic manifested on an investigational topographic feature defined on a geometric test shape. The physical characteristic is one which correlates with targeting accuracy of the dispensing unit. Dispensing of fluidizable material is modified based on analysis of the physical characteristic.

DESCRIPTION OF THE PREFERRED EMBODIMENT

The present invention is directed to a method for aligning multiple dispensing members present in a solid free form fabrication tool. As used herein, the term "solid free form fabrication" is defined to include various devices and technologies which build a three-dimensional object of any complex shape without employing a pre-shaped tool such as a die or a mold, for example in a layer-by-layer or point-by-point manner. Such solid free form objects may be prepared by the systematic, iterative dispensing of at least one material in a method which iteratively forms the complex shape desired. Solid free form fabrication (SFF) methods typically rely upon dispensing measured volumes of material onto a suitable receiving surface at precisely targeted locations. The receiving surface is either the base surface onto which initial material is positioned or is composed of previously dispensed material either alone or in combination with other compounds necessary to successfully produce the solid free form object of choice.

The materials employed in producing a solid free form object are dispensed from suitable dispensing members. "Dispensing" is taken to mean a process whereby at least one material employed in the SFF process is deployed onto a suitable receiving media. Deployment is broadly construed to include non-contact introduction of SFF material such as introduction of discrete droplets of material into contact with the receiving media as would occur, for example, in various liquid jetting applications as well as introduction of continuous volumes of material as would occur in fused deposition modeling (FDM).

As employed herein, the dispensing member(s) typically include one or more exit orifices through which material can be dispensed. In drop ejection devices and processes, these orifices are referred to as nozzle members. The term "dispensing member" as used herein is defined as any mechanism or device which is capable of dispensing an appropriately targeted volume of material upon receipt of an appropriate command.

Materials employed in the method as disclosed are those suitable for solid free form manufacture. Such materials include, but are not limited to, various liquid materials as well as solid materials which can be fluidized by any appropriate process. The resulting fluidizable material is capable of being metered and provided a directed exit from at least one of the dispensing devices.

Figure 1:
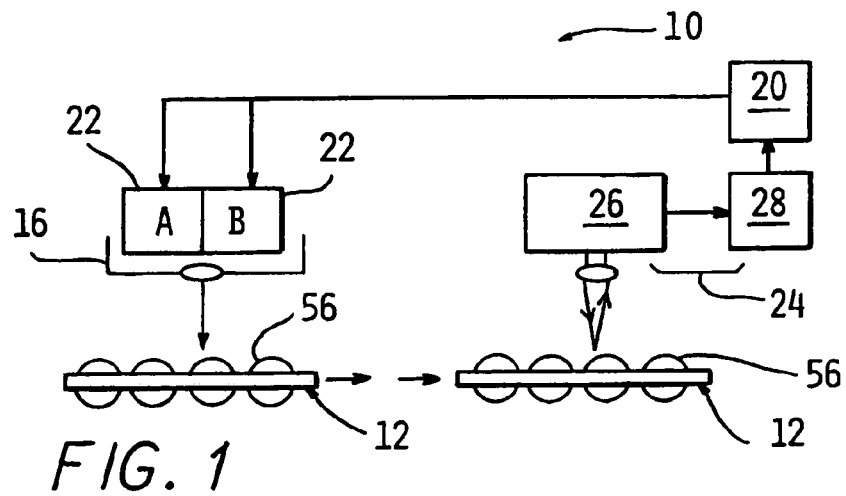
FIG. 1 is a schematic representation of a solid free form fabrication tool with an appropriate test mechanism integrated therewith.

Referring to FIG. 1, a schematic diagram of a nozzle alignment system as disclosed is depicted at reference numeral 10. A three-dimensional geometric test shape 12 is prepared by the solid free form fabrication process and device to be utilized in subsequent production processes. The three-dimensional geometric test shape 12 may be of any size and/or geometric shape or configuration amenable to analysis and study to yield information and insight into the alignment of one or more dispensing mechanisms such as nozzle members 22 held in dispensing member 16.

Figure 2:
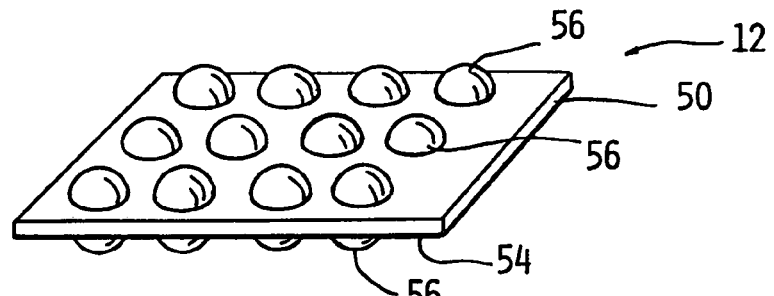
FIG. 2 is a perspective view of a geometric test shape having a plurality of outwardly projecting investigational topographic features.

As used herein the term "three-dimensional test shape" is defined as a geometric construct prepared for its ability to illustrate and demonstrate at least one physical characteristic which manifests itself in three dimensions. The three-dimensional geometric test shape 12 produced in the alignment method as disclosed may have any suitable shape, contour or configuration which would facilitate analysis to provide data regarding the targeting accuracy of one or more nozzle members associated with the dispensing member(s) 16. It is contemplated that the three-dimensional geometric test shape 12 will have at least one continuous surface which may be viewed from one or more orientations to ascertain any irregularities which may be present in the geometric test shape 12 as formed. The continuous surface of three-dimensional geometric test shape 12 will be configured to have suitable contoured regions projecting outward or extending inward from a general surface, which can be planar if desired. As depicted in FIGS. 1 and 2, the geometric test shape 12 has a central body 50 having an upper surface 52 and a lower surface 54. At least one investigational topographic feature 56 extends outward from either the upper surface 52 or the lower surface 54. As shown in FIGS. 1 and 2, investigational topographic features 56 may extend from both surfaces 52, 54 as desired or required. It is also contemplated that investigational topographic features 56 can be configured depressions which extend inward from the upper surface, such as upper surface 52, and/or from the lower surface, such as lower surface 54.

Figure 11:
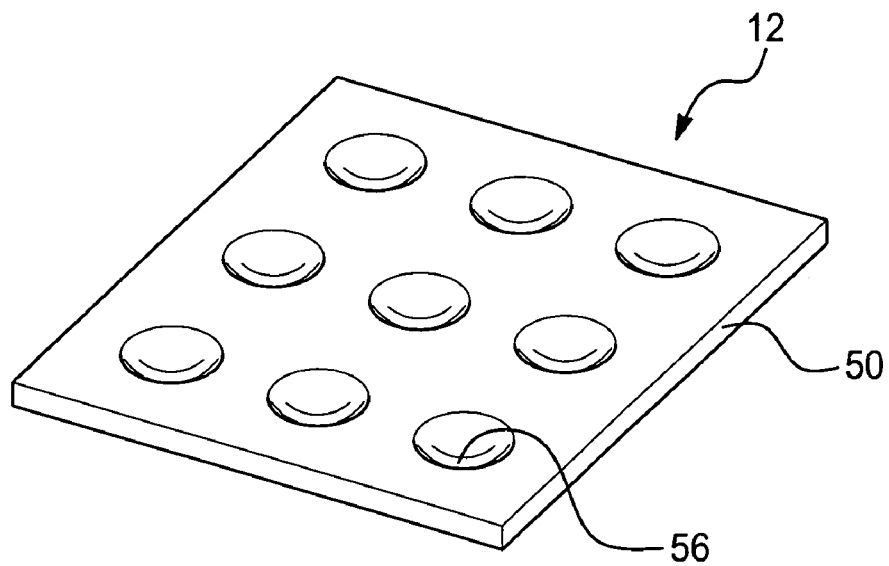
FIG. 11 is a perspective view of a geometric test shape having a plurality of inwardly projecting investigational topographic features.
Figure 12:
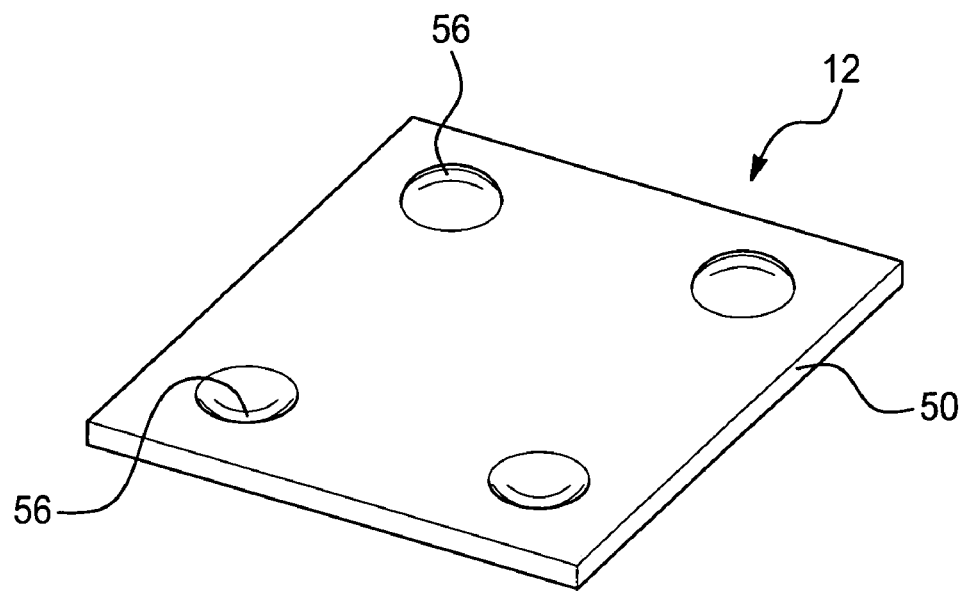
FIG. 12 is a perspective view of a geometric test shape having a plurality of outwardly projecting and inwardly projecting investigational topographic features.

The investigational topographic feature(s) 56 can have any shape or contour which will facilitate physical characteristic analysis. As shown in FIGS. 1 and 2, investigational topographic features 56 are an array of hemispheric domes projecting outward from surfaces 52 and 54. Alternately, the investigational topographic feature 56 may be an array of concave depressions extending inward from the surfaces 52 and 54 (an example of inwardly extending depressions is shown in FIG. 11). It is also contemplated that a geometric test shape 12 may have a combination of outwardly projecting investigational topographic features 56 and inwardly projecting investigational topographic features 56 as desired or required (as shown in FIG. 12).

The investigational topographic feature(s) 56 may have various other configurations and geometries as desired and required. The investigational topographic feature(s) 56 will have at least one continuous surface region configured to facilitate physical characteristic analysis of surface or material discontinuities or irregularities. Thus, it is contemplated that one or more of shape, size, contour, and color, can vary from investigational topographic feature 56 to investigational topographic feature 56 on a given geometric test shape 12 to facilitate such analysis and nozzle alignment. This variation can be accomplished by varying the material deposition pattern or sequence executed by dispensing member 16 in forming the geometric test shape 12. The resulting three-dimensional geometric test shape 12 and associated investigational topographic features 56 can be analyzed individually and/or collectively for physical characteristics which correlate to targeting accuracy. Examples of such physical characteristics include, but are not limited to, color hue shift, dimensional accuracy and surface irregularity. Such physical characteristics may be manifested in various ways. For example, color hue shift can manifest as a concentration of one color on one region depicted as stippled region 58 in FIG. 3 and concentration of a second color on a different, generally opposed region of the investigational topographic feature 56.

While hemispheric domes and concavities have been discussed as suitable continuous surface configurations for the investigational topographic features 56 on the geometric test shape 12, it is also within the purview of this disclosure to produce a three-dimensional geometric test shape 12 having investigational topographic feature(s) 56 which have angular or planar surfaces depending upon the nature of the physical characteristic analysis being conducted. Thus, the investigational topographic feature(s) 56 located on the three-dimensional geometric test shapes 12 can include pyramids 56', rectilinear three-dimensional shapes and the like, for example. The pyramids 56', rectilinear three-dimensional shapes and the like can project outward from the central body 50 or geometrically defined depressions can extend inward as desired or required. It is also contemplated that combinations of inwardly oriented depressions and outward projections can be utilized. Size, contour, color, etc. can vary from investigational topographic feature 56 to investigational topographic feature 56. Variations can be accomplished by implementing an established deposition pattern or sequence which is executed by dispensing member 16. The resulting investigational topographic feature(s) 56 on the three-dimensional geometric test shape 12 can be analyzed to ascertain physical characteristics which correlate to targeting accuracy.

Where a three-dimensional geometric test shape 12 with multiple investigational topographic features 56 is produced, the individual topographic features 56 may be produced by the systematic actuation of combinations of various specified nozzle members 22 to ascertain the targeting accuracy of the various multiple nozzle members 22 relative to each other. Analysis of multiple investigational topographic features 56 on a geometric test shape 12 will provide information which can be compiled to produce data regarding targeting accuracy of the associated nozzle members 22.

In the alignment method as disclosed, nozzle members 22 associated with dispensing device 16 can be suitable electronically controllable jetting devices. Examples of such electronically controllable jetting devices include, but are not limited to, drop on demand liquid ejection devices. The electronically controllable jetting device or devices are preferably ones which permit targeted emission of discrete volumes of fluidizable material in a defined and controlled manner. Suitable liquid ejection devices can include devices having configurations and architecture similar to that employed in ink jets. Such ink jets have suitably configured and controlled nozzles adapted to eject or emit measured, defined volumes of fluidizable material upon receipt of an actuation command. While the nozzle alignment method disclosed is described in particular relation to drop on demand liquid ejection devices, it is contemplated that the alignment method has useful application in other drop ejection devices as well as in continuous stream deposition methods such as fused deposition modeling (FDM). The alignment technique disclosed may be used on other solid free form fabrication devices and in other SFF techniques as applicable.

The fluidizable material to be dispensed can be held in a suitable storage vessel or reservoir. The dispensing member(s) 16 of the solid free fabrication device may include a plurality of nozzle members 22 communicating with one or more fluid reservoirs which are either proximate to the nozzle member 22 or remote therefrom. As shown in FIG. 1, the dispensing member 16 may be in suitable fluid communication with at least two nozzle members 22 designated as nozzle member A and nozzle member B. Nozzle members A and B each emit at least one fluidizable material employed in the construction of the three-dimensional geometric test shape 12, and ultimately in the construction of solid free form object(s).

While nozzle members A and B are described, the solid free form fabrication alignment method and device may include any number of nozzle members 22 dispatching any number of different materials used in the solid free form fabrication process. The various materials may be compositionally identical, similar or different. Variation can also occur in the color of material dispensed. The composition, nature and/or color of the various dispensed materials will be that necessary to produce the ultimate SFF object. As indicated, dispensing nozzle members A and B are configured to convey associated material from suitable storage reservoirs. Such reservoirs or storage chambers can be positioned proximate to the dispensing nozzle members 22 as would generally occur in on-axis delivery systems. Reservoirs or storage chambers can be positioned remote from the dispensing nozzle members A and B as would typically occur in off-axis delivery systems. Where fluid storage is proximate to the nozzle members 22, it is contemplated that the nozzle members 22 and fluidizable material(s) can be located in a suitable cartridge. The cartridge may also have a memory storage unit associated therewith, which can work interactively with the dispensing member 16. The dispensing member 16 operates on an electronically actuated head such as would be found on a drop on demand print head. Such print heads are commonly used to eject ink in ink jet printing devices and can include, for example, piezoelectric and thermal ink jet print heads as well as continuous ink jet print heads.

An automated, semi-automated or manual analysis can be employed to facilitate alignment of nozzle members 22 as schematically depicted in FIG. 1. As depicted, a controller 20 may be coupled to a suitable data acquisition device 24. Data acquisition devices 24 suitable for use in the present system are those which are capable of detecting a physical characteristic or characteristics manifested in at least one of the investigational topographic features 56 of the three-dimensional geometric test shape 12 which varies or deviates from accepted or predetermined norms. While an automated visual inspection device is depicted, both automated inspection as well as visual or manual inspection can be utilized to acquire information on a physical characteristic or characteristics of interest. At least a portion of this information may be captured by a suitable data acquisition system 24 as desired or required. Manual inspection can include visual inspection and physical inspection of the three-dimensional geometric test shape 12 in general and the associated investigational topographical region(s) 56 in particular. Examples of such analysis include, but are not limited to, analysis of high visual contrast characteristics as well as irregularities or discontinuities in color, surface finish, and the like. Automated inspection techniques and/or visual and manual inspection techniques can be employed to acquire information on a physical characteristic or characteristics of interest.

It is also within the purview of this disclosure to perform automated mechanical and/or electromechanical inspection of at least one investigational topographic region 56. As depicted in FIG. 1, the data acquisition system 24 can be an electromechanical system which includes at least one device 26 capable of detecting at least one physical characteristic of at least one portion of the three-dimensional geometric test shape 12 produced. The physical characteristic of interest is preferably one with attributes which can be suitably quantified and correlated to alignment accuracy of one or more nozzle members 22. Examples include but are not limited to color hue shift or continuity, dimensional accuracy, surface finish and part integrity.

In order to ascertain the characteristic in question, the measuring device 26 can be configured to measure and record information about the three-dimensional geometric test shape 12 in general and the physical characteristic manifested in one or more investigational topographic feature 56 in particular. For example, color hue shift or color continuity can be measured and ascertained by a suitable vision system configured to capture optical data. Details regarding dimensional accuracy surface, continuity and part integrity can be similarly measured using an appropriately configured device or devices. In the method and device disclosed, the data acquisition system 24 may be integrated into the solid free form fabrication tool. Alternatively, the data acquisition system 24 may be temporarily connected to the solid free form fabrication tool to provide suitable nozzle adjustment information and strategies.

The data acquisition device 24 may be associated with a suitable data processing interpretation unit 28. The data processing/interpretation unit 28 is coupled to controller 20. Typically, the controller 20 will be capable of producing alignment adjustments to the dispensing devices 16 as a result of information received from the data acquisition system 24.

The method as disclosed may also be employed to provide data and/or alignment solutions which can be transmitted as desired or required to accomplish nozzle alignments. Transmission can be to devices external to the solid free form fabricating mechanism or to internal devices as desired or required. For example, information obtained by the alignment method of the present invention can be transmitted to appropriate devices for modifying datum surfaces present on an associated cartridge or print head. It is also contemplated that the analytical data derived from the geometric test shape 12 can be translated into viable offset data which can be employed to automatically adjust the timing of drop ejection between various members of the dispensing device 16 so that material dispensed from the various nozzles of different members is placed properly relative to one another.

It is also contemplated that the method and device as disclosed can be employed in an iterative manner to improve alignment pattern and to determine actual alignment offset between multiple nozzle members 22 in a solid free form system. Interactive offset data can be employed to adjust timing of drop ejection between various nozzle members 22 so that material is placed properly and accurately. The data can also be mapped to a different nozzle in the nozzle array axis where desired or required.

Once produced, the geometric test shape 12 can be moved or manipulated in any fashion which will facilitate appropriate analysis. As depicted in FIG. 1, the geometric test shape 12 can be transferred to a suitable inspection station for analysis. Other operations are contemplated as being within the purview of this disclosure.

As depicted in FIG. 1, adjustment of dispensing device 16 can be governed by a suitable control device, such as controller 20. Controller 20 can be configured to receive output generated from analysis of the physical characteristics of the three-dimensional geometric test shape 12 and generate output relevant to alignment solutions.

Figure 5:
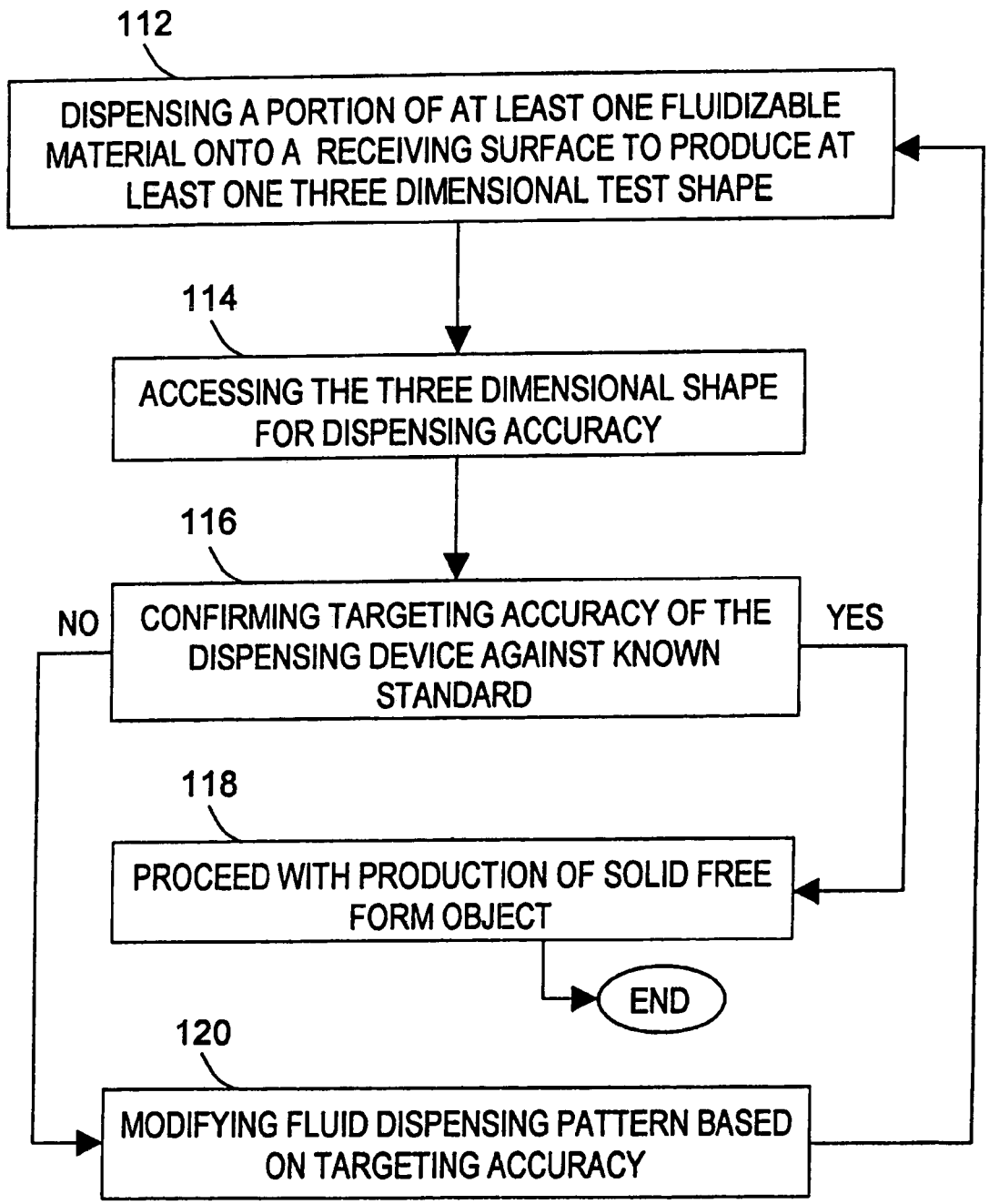
FIG. 5 is a process diagram of a targeting alignment method of the present invention.

Referring now to the process diagram of FIG. 5, there is set forth an overall procedure for alignment of multiple dispensing nozzle members 22 in a solid free form fabricating tool. At reference numeral 112, a portion of a fluidizable material is dispensed onto a suitable receiving surface to produce at least one three-dimensional geometric test shape 12. The fluidizable material can be dispensed from the suitable dispensing device 16 through nozzle members 22 such as a piezoelectric jetting members, a thermal jetting members, and the like. It is also to be considered within the purview of this invention that any number of various jetting devices can be employed to dispense fluidizable material in situations where the use of variously configured jetting members will provide advantageous dispensing of the material or materials employed.

At least one physical characteristic of the resulting three-dimensional geometric test shape 12 is measured at reference numeral 114. For example, the three-dimensional geometric test shape 12 can be analyzed for at least one characteristic, such as color hue shift, dimensional accuracy, surface finish characteristics part integrity or continuity of dispensed material. Analysis of the physical characteristic under study can be accomplished by a suitable analytical method or procedure.

Analysis can be conducted on one or more of the investigational topographic regions 56. Analysis of various investigational topographic regions 56 can be compared to further determine targeting accuracy and assist in developing targeting adjustment strategies as desired or required. Investigation and analysis can be conducted over the width, breadth and/or height of one or more of the investigational topographic regions 56 of the geometric test shape 12. The geometric test shape 12 can be oriented, rotated, and/or moved to maximize the amount and value of data developed.

The targeting accuracy of the dispensing device 16 is assessed against a defined tolerance or tolerances at reference numeral 116. Accuracy assessment is based upon the physical characteristic or characteristics of the three-dimensional geometric test shape or shapes 12 as measured. When the assessment of the three-dimensional geometric test shape 12 falls within pre-accepted standards or tolerances, the process proceeds to the production of the desired solid free form object as indicated at reference numeral 118. Indication that the physical characteristics of the three-dimensional geometric test shape 12 fall within predetermined or acceptable standards or norms may be in the form of any suitable signal or command which will initiate the production of the desired end-use solid free form object or simply indicate conformance and compliance.

Where assessment of one or more physical characteristic of the three-dimensional geometric test shape 12 falls outside accepted standards, the nozzle members 22 and fluid dispensing pattern is modified at reference numeral 120. Modification strategies can be based upon data generated regarding the variation of the investigational topographic region or regions 56 of the geometric test shape 12 from accepted norms indicative of targeting accuracy.

The analytical process can be iterated through multiple cycles until a three-dimensional geometric test shape 12 within defined tolerances is produced and targeting accuracy is confirmed. Once the desired tolerances are obtained, production of the desired number of solid free form objects can commence.

It is contemplated that the alignment method as disclosed may be implemented at any time prior to a production run. Thus, the alignment method and verification process may occur as a step during the manufacture and assembly of the solid free form manufacturing apparatus. It is also contemplated that the alignment method can be implemented on a periodic or as-needed basis during the lifetime of the solid free form fabrication tool. The alignment method as disclosed may be implemented upon removal, replacement or addition of dispensing devices 16 and/or nozzle members 22 as well as for quality assurance validation and the like.

Figure 3:
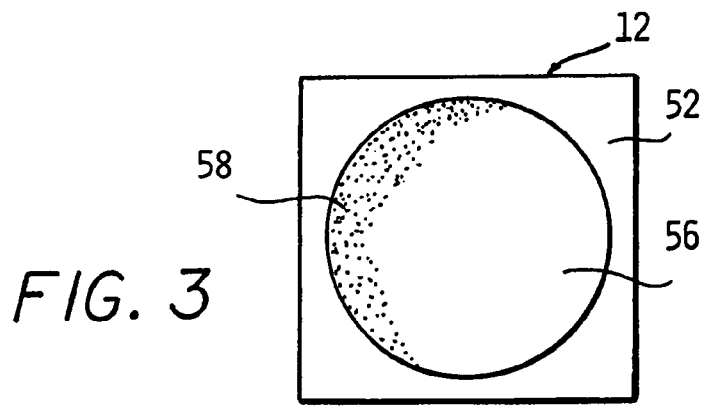
FIG. 3 is a top view of a representative investigational topographic feature of the geometric test shape of FIG. 2.
Figure 4:
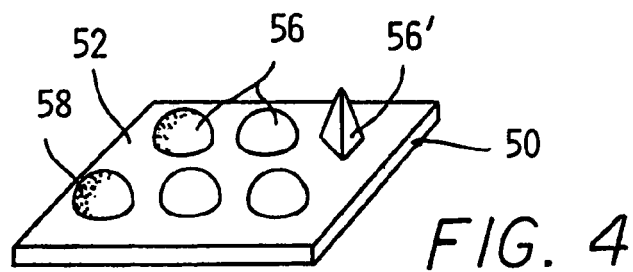
FIG. 4 is a perspective view of an alternative geometric test shape.
Figure 6A:
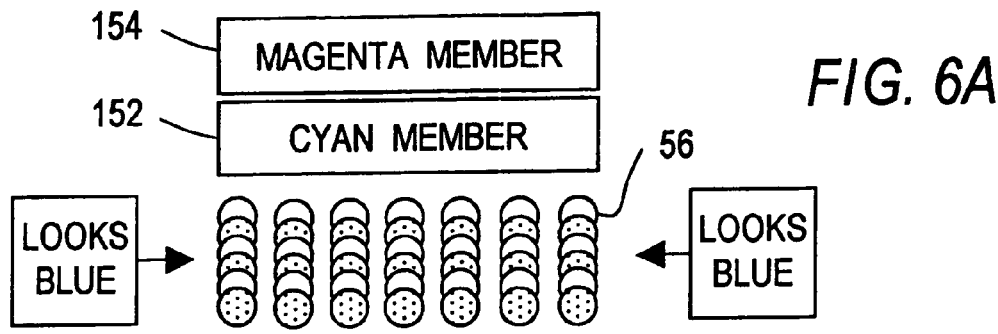
FIG. 6A is a schematic representation of a solid free form fabrication showing color accuracy resulting from good member-to-member alignment.
Figure 6B:
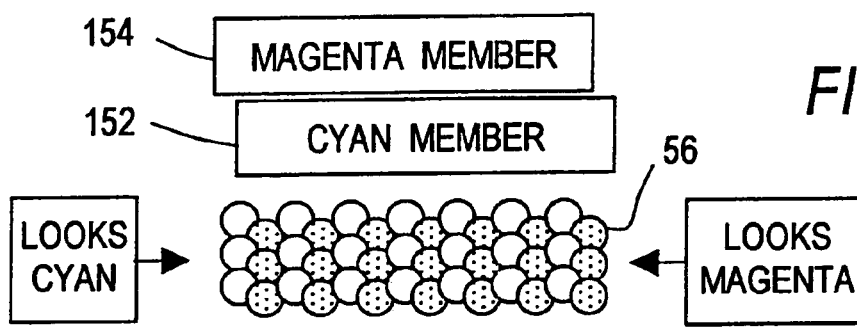
FIG. 6B is a schematic representation of solid free form fabrication showing poor color accuracy resulting from poor member-to-member alignment.

The method and device of the present invention can be used to assure dispensing device alignment and to correct for various fabrication anomalies. Referring now to FIGS. 6A and 6B, color hue shift alignment analysis is illustrated. In FIGS. 6A and 6B, a portion of at least two different fluidizable materials having visually distinct colors are dispensed from two distinct members 152, 154 to form at least one investigational topographic region 56 shown in partial cross-section. The visually distinct colors can be any suitably compatible colors which, when appropriately positioned, merge to form a unified single color. For example, investigation topographic region 56 presented in FIG. 6A is produced by material dispensed from two separate members designated as 152 and 154. Member 152 contains a cyan material while member 154 contains a magenta material. When nozzle members 22 are aligned correctly, the material provides an investigational topographic region 56 that is produced on the three-dimensional test shape 12 and is perceived as having a continuous blue color. In contrast, investigational topographic region 56 set forth in FIG. 6B is produced by members 152 and 154 which are misaligned relative to the receiving surface and each other. The resulting investigational topographic region 56 has a first surface region which appears as cyan and an opposed second surface region which appears magenta. When the entire investigational topographic region 56 is viewed, nozzle member 22 misalignment may present color discontinuity, which is illustrated in FIG. 3 as shaded region 58. The geometry and contour of investigational topographic region 56 facilitates ready observation and potential measurement and quantification of color hue shift in one observational dimension without requiring undue manipulation or rotation of the geometric test shape 12.

While the foregoing discussion has been directed to colors that are discernable in the visible spectra, it is also contemplated that materials having color wavelengths in the non-visible spectra may also be employed. Additionally, it is contemplated that material or discrete portions of material can be tagged with a suitable compound or marker which will emit in the non-visible spectrum or will become visible under appropriate test conditions to permit, facilitate or augment analysis.

To further facilitate color hue shift analysis, multiple investigational topographic features 56 can be built on an upper surface 52 and/or lower surface 54 of the central body 50 to facilitate observation and analysis. The various investigational topographic regions 56 can be produced by various two-color combinations. Color hue shifts can be readily observed in one observational plane. To further facilitate observation, the upper and lower surfaces 52, 54 may be constructed from a material in a high contrast color which provides sharp distinction between the investigational topographic feature(s) 56 and the surrounding surface. For example, the various investigational topographic regions 56 may be colored according to various two-color combinations utilizing the various pigment options available for use in the solid free form fabrication tool to create an array of investigational topographic regions 56. The central body 50 in this example can be a neutral high contrast color, such as gray.

In the method as disclosed, the color continuity and possible color hue shift can be measured against predetermined tolerances. Based upon conformance to or deviation from the predetermined tolerances, a correction routine is generated, which acts upon the dispensing pattern of the fluidizable materials. Correction routines can be iteratively employed until color continuity data within the predetermined tolerances is achieved. At that point, a solid free form object can be produced.

The method depicted in FIG. 5 can be employed over an array of investigational topographic features 56 on a three-dimensional geometric test shape 12 using various color pairs to ascertain color hue shift and associated misalignment for various members 16 dispersing material or materials of various colors. Thus, it is contemplated that the method disclosed can utilize a suitable means for analyzing an array of investigational topographic regions 56 on the geometric test shape 12 to provide offset data useful in adjustment of nozzle members 22 in the solid free form fabrication tool. Comparative analysis may be accomplished against a suitable library of predetermined color norms. The library information may be maintained in any suitable data storage device. The device may be maintained on any suitable element, for example, on the print head, cartridge, etc. Data derived from analysis of the array can be utilized to provide targeting solutions and adjustment strategies.

Figure 7A:
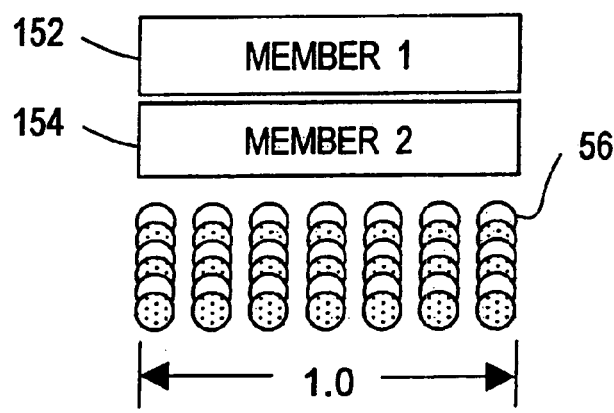
FIG. 7A is a schematic diagram of a solid free form fabrication exhibiting good dimensional accuracy resulting from good member-to-member alignment.
Figure 7B:
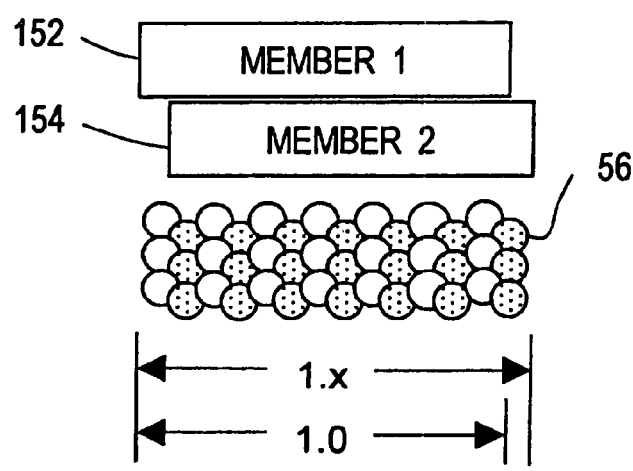
FIG. 7B is a schematic diagram of a solid free form fabrication exhibiting poor dimensional accuracy resulting from poor member-to-member alignment.

Analysis of the dimensional accuracy of investigational topographic features 56 built on a three-dimensional geometric test shape 12 can also be employed to provide alignment solutions for multiple nozzle members 22. As illustrated in FIG. 7A, at least one geometric test shape 12 having an investigational topographic feature 56 as depicted in partial cross section, is produced from material dispensed from at least two dispensing members 152, 154. The dimensional accuracy of at least one investigational topographic feature 56 on the three-dimensional geometric test shape 12 is determined by a suitable measurement method and device. If the dimensional accuracy of the investigational topographic feature 56 so produced falls within defined or acceptable dimensional tolerances or norms, a suitable validation notice may be generated. The notice may result in a command to initiate production of the desired end-use solid free form object. Dimensional tolerances outside a predetermined tolerance standard as in FIG. 7B, can indicate member-to-member misalignment. In FIG. 7A, members 152 and 154 have a defined dispensing pattern which provides a three-dimensional geometric test shape 12 having a first width of 1.0. Dimensional deviation in excess of this width, as in FIG. 7B, indicates a misalignment of one of the given members 152, 154.

Figure 8A:
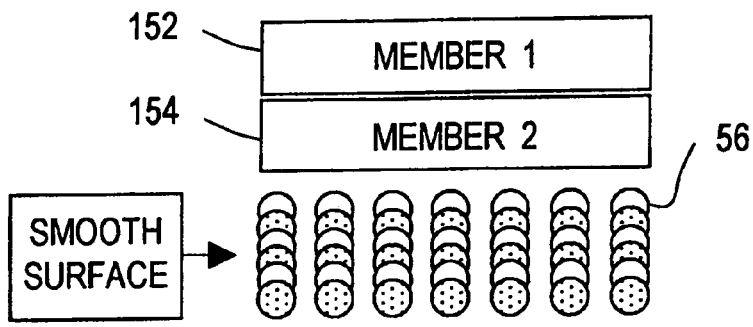
FIG. 8A is a schematic representation of a solid free form fabrication having acceptable surface finish characteristics resulting from good member-to-member alignments.
Figure 8B:
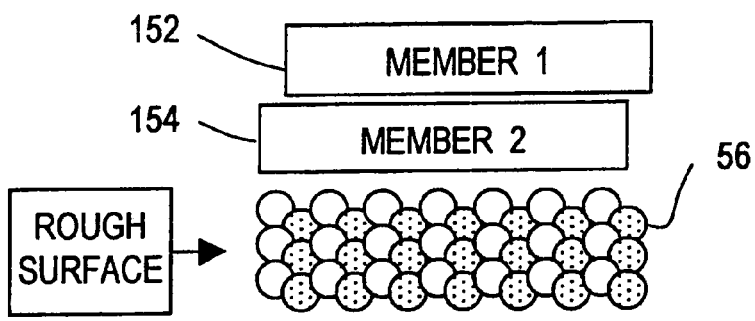
FIG. 8B is a schematic representation of a solid free form fabrication showing substandard surface finish characteristics based upon poor member-to-member alignments.

Defects in surface finish of investigational topographic feature(s) 56 on three-dimensional geometric test shape or shapes 12 can be analyzed to provide nozzle member 22 alignment solution or solutions. Proper alignment of nozzle members 22, such as nozzle members 152 and 154, will yield a surface finish whose contours fall within a certain pattern or deviation as indicated in FIG. 8A. As indicated in FIG. 8B, misalignment of members 152 and 154 will produce an investigational topographic feature(s) 56 on a three-dimensional geometric test shape 12 which possesses characteristic surface irregularity. Analysis of the location and nature of the surface irregularity or irregularities on investigational topographic feature(s) 56 can be utilized to provide data regarding the degree and type of misalignment of members 152 and 154. In the alignment method of the present disclosure, characteristics of surface irregularity can be correlated to member misalignment and the affected members can be adjusted to bring the members into appropriate alignment.

Figure 9A:
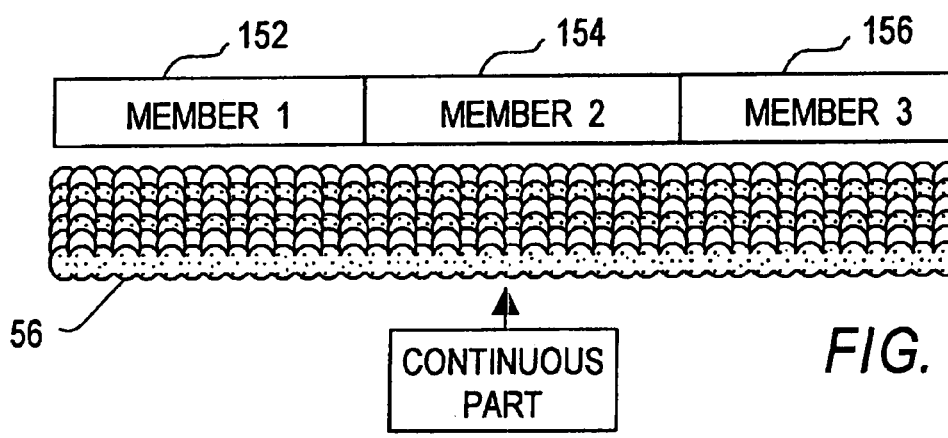
FIG. 9A is a schematic representation of a solid free form fabrication having good surface and substrate continuity resulting from good member-to-member alignment.
Figure 9B:
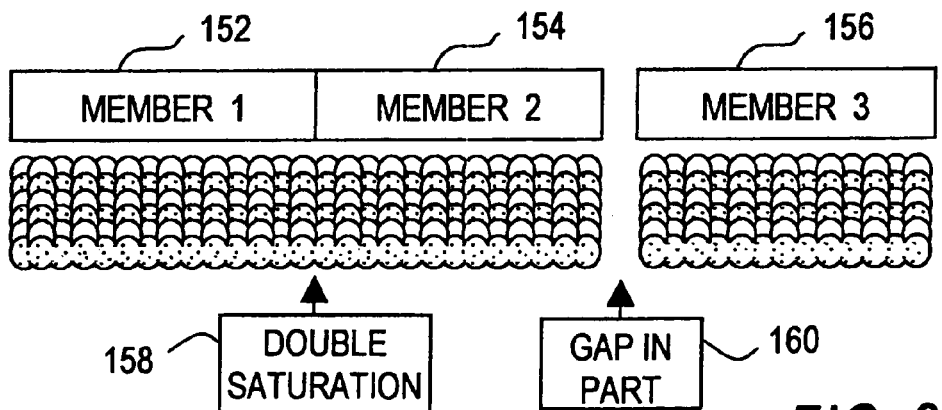
FIG. 9B is a schematic representation of a solid free form fabrication having impaired part integrity based upon poor member-to-member alignment.

Defects or deficiencies in part integrity manifested in one or more investigational topographic features 56 in the geometric test shape 12 can also be analyzed to provide nozzle member 22 alignment solutions or solutions. As indicated in FIG. 9A, members 152, 154 and 156, when placed in proper alignment, will yield an investigational topographic feature 56 having an appropriately continuous solid substrate. Poor alignment between any one of members 152, 154 and 156 as indicated in FIG. 9B can produce an investigational topographic feature 56 on a geometric test shape 12 having regions of double surface saturation, as at 158, and/or regions where the part exhibits a gap or deficiency in saturation, as at 160.

Figure 10:
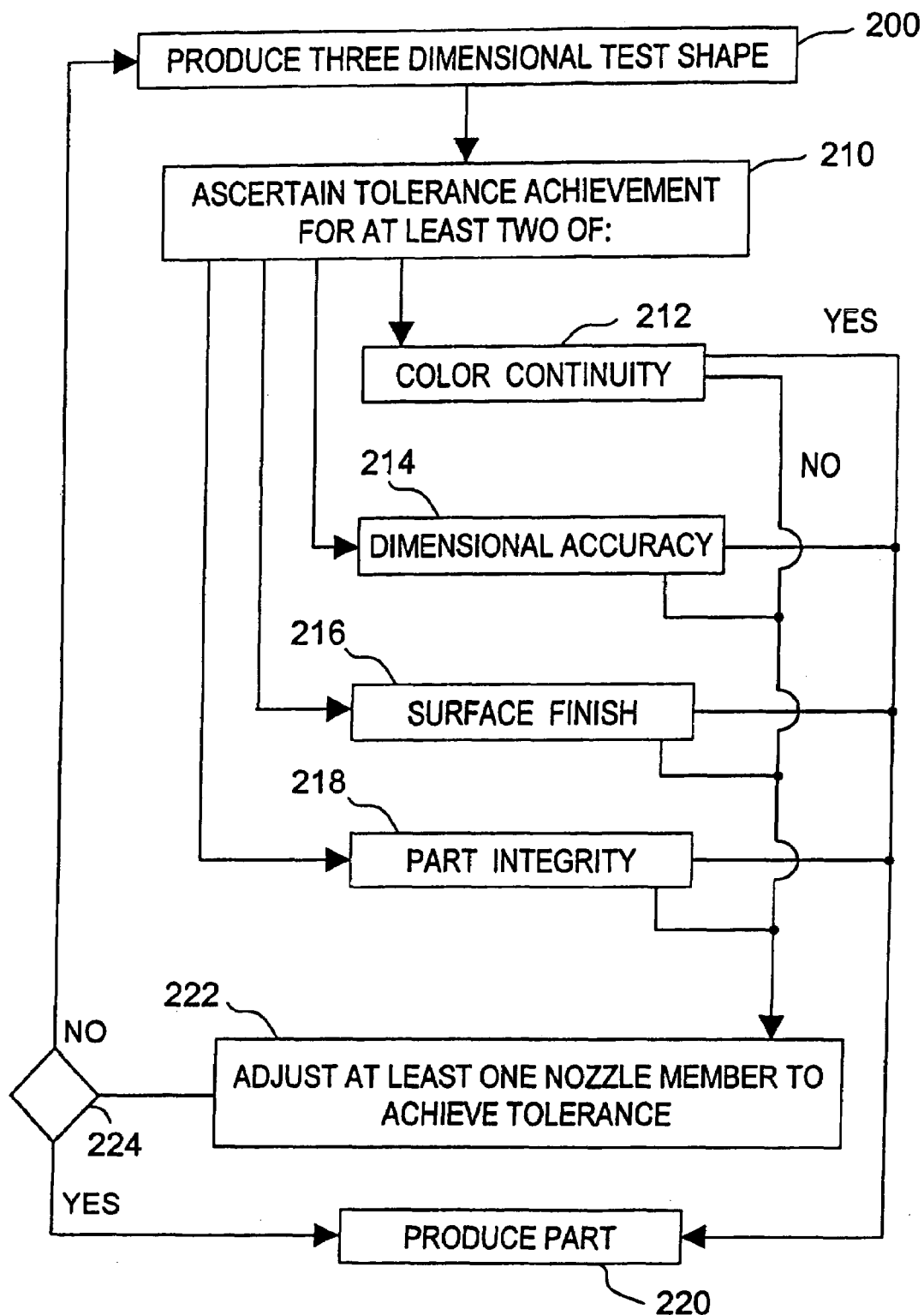
FIG. 10 is a process diagram of a targeting alignment method of the present invention analyzing for various criteria.

It is also considered within the purview of the method as disclosed to analyze the three-dimensional geometric test shape 12 for multiple physical criteria. In the process outlined in FIG. 10, a three-dimensional geometric test shape 12 can be produced as at reference numeral 200. The three-dimensional geometric test shape 12 can be analyzed to ascertain tolerance achievement for at least two distinct physical characteristics as at reference numeral 210. The physical characteristics can include, but are not limited to, color continuity or color hue shift 212, dimensional accuracy 214, surface finish 216 and part integrity 218. If the specified characteristics are within tolerance, a suitable signal or command can be generated and a part generated as at reference numeral 220. It is also contemplated that a suitable signal or indicator can be developed that signals nozzle alignment.

If at least one of the characteristics falls outside of the predetermined tolerance limits, appropriate alignment strategies can be generated and at least one nozzle member 22 can be adjusted to achieve tolerance at reference numeral 222. After adjustment of at least one nozzle member 22 to achieve tolerance, a final part can be produced. Alternatively, the analytical procedure can be repeated by producing an additional three-dimensional geometric test shape 12 as indicated at decision junction 224. The decision criteria at junction 224 may include the degree of misalignment ascertained by the physical inspection and comparison with analytical criteria and the criticality of the misalignment etc. When appropriate criteria are met, a yes answer to a query regarding tolerance at 224 results in proceeding to part production. A negative answer results in reiteration of the process. Where appropriate, the process can proceed directly to part production or to iteratively analyze additional three-dimensional geometric test shapes produced after adjustment to ensure part integrity and performance. The number of iterations undertaken is that necessary to produce a desired part within the tolerances required. Thus, the process as disclosed contemplates production of at least one geometric test shape 12. However, a plurality of three-dimensional geometric test shapes 12 can be iteratively produced by this process based upon information ascertained regarding analysis of at least one or more of the key characteristics which include, but are not limited to color continuity, dimensional accuracy, surface finish and part integrity.

In the alignment method as disclosed, the analysis of a three-dimensional geometric test shape or shapes 12 may be accomplished by physical inspection, electronic inspection, or any combination of physical and electronic inspection which will provide alignment strategies and solutions within the required tolerances. As used herein "physical inspection" refers to analysis and inspection performed by a human operator with or without augmentation codes such as color variation, gross surface, irregularity and the like. It is also contemplated that the human operator can contribute or derive and implement at least a portion of the alignment solution in certain situations.

The term "electronic inspection" as used herein refers to various forms of machine augmented analysis, such as, for color continuity, surface regularity and the like using color sensors, laser profilometers and various interactive sensor devices.

Data accumulated from physical and/or electronic inspection is recorded and analyzed by a suitable algorithm or analytical subroutine to produce operable output regarding misalignment of one or more nozzle members 22. Such data can be acted upon to correct nozzle misalignment.

Alignment of at least one nozzle member 22 can occur by manual intervention, or automated adjustment through appropriate systems and subroutines contained at a suitable location and communicatable with the appropriate nozzle member 22. It is anticipated that such systems and subroutines can be stored in a suitable analytical device or could be communicated to an appropriate data storage unit associated with the nozzle member 22 and/or mechanism which controls multiple nozzle members 22 as desired or required.

Position, dimensional accuracy and offset can be analyzed by any suitable analysis tool. These can include visual inspection and also can include appropriate automated analysis by mechanisms such as a laser profilometer and other analytical mechanisms. The analytical mechanisms of choice can be either manually operated or automated depending upon the nature of the analysis being performed.

It is contemplated that the analytical data generated can be employed in a variety of nozzle targeting strategies. Thus, once misalignment of a nozzle member 22 has been indicated by analysis of the three dimensional test shape 12, the nozzle member 22 can be aligned by a variety of suitable methods. Nozzle members 22 with datum surfaces can be employed to align the multiple nozzle members 22 in a solid free form system. Datum surfaces on the given nozzle member 22 match up with corresponding datum surfaces within a pocket or similar structure defined in the solid free form production system. The data generated from the analysis of the three-dimensional geometric test shape 12 can be employed to produce appropriate solutions regarding the proper sequence of forces to bias the datum surfaces of the given nozzle member(s) 22 into contact with pocket datum surfaces. Such systems permit reproducible alignment of a nozzle member 22 from insertion to insertion.

Data generated from the analytical processes in the present invention can be employed to precisely machine datum surfaces to align multiple nozzle members 22 within a solid free form system. In such systems, precisely machined datum surfaces will provide for precision alignment of nozzle members 22 in a solid free form system. It is anticipated that such procedures can be useful in situations where nozzle members 22 are integrated into complex build devices and employed over significant periods of time.

It is also contemplated that data generated by such analysis can be encoded into suitable data storage media on the print head to permit alignment derived from an appropriate measurement tool and recording the alignment offset in an integral information device such as a data storage member or data analytical device which is located on the nozzle member 22. The solid free form system could use the offset data to automatically adjust the timing of drop ejection between the various members 16 so that materials emanating from the nozzles 22 of the different members 16 would be placed properly relative to one another in the scan axis. It is also contemplated that data could be mapped to a different nozzle to correct the nozzle array axis. It is contemplated that such systems would allow better inherent alignment of the system.

The analytical data generated by the method disclosed can also be integrated into a system which employs an optical sensor to measure the location of the ejected binder and/or dispensed material from various nozzle members 22 to determine the alignment offset between the multiple nozzle members 22 of a solid free form system. The system can use the offset data to automatically adjust the timing of the drop ejection between the various members so that the binder and dispensed material are properly placed relative to one another. Such a system would be integrated in a manner which would be automatic, accurate and exhibit enhanced repeatability.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for producing a solid free form article comprising the steps of:
dispensing fluidizable material from a dispensing unit onto a receiving surface in a targeted iterative process to produce a three-dimensional test shape, having at least one investigational topographic feature defined thereon;
analyzing at least one physical characteristic present in the investigational topographic region, the physical characteristic correlative with targeting accuracy of the dispensing unit, wherein the at least one physical characteristic is color hue shift; and
modifying dispensing of fluidizable material based on the analyzing step.

2. The method of claim 1 wherein the portion of at least one fluidizable material is dispensed from at least one dispensing unit, the dispensing unit having at least two nozzle members.

3. The method of claim 2 wherein each nozzle member is part of an electronically controllable drop ejection device.

4. The method of claim 1 wherein the dispensing unit is a drop on demand device having multiple nozzle members, and wherein the nozzle members are in communication with at least two sources of fluidizable material to be dispensed for integration into the solid free form article.

5. The method of claim 1 wherein analytic data obtained by analysis of the investigational topographic feature of the three-dimensional geometric test shape includes offset data derived from the color hue shift.

6. The method of claim 1 wherein the three-dimensional geometric test shape is produced by the imposition of at least two fluidizable materials onto a reception surface.

7. The method of claim 6 where the three-dimensional geometric test shape has multiple investigational topographic features configured to facilitate detection of the at least one physical characteristic correlative of targeting accuracy.

8. The method of claim 1 wherein the three-dimensional geometric test shape is a solid comprising a central body having an outer surface, the investigational topographic feature projecting outward from the outer surface of the central body.

9. The method of claim 1 wherein the three-dimensional geometric test shape is a solid comprising a central body having an outer surface, the investigational topographic feature projecting inward from the outer surface of the central body.

10. A method for producing a solid free form article comprising the steps of:
dispensing fluidizable material from a dispensing unit onto a receiving surface in a targeted iterative process to produce a three-dimensional test shape, having at least one investigational topographic feature defined thereon, wherein the dispensing unit has at least two nozzle members;
analyzing at least one physical characteristic present in the investigational topographic region, the physical characteristic correlative with targeting accuracy of the dispensing unit; and
modifying dispensing of the fluidizable material based on the analyzing step, wherein the fluid dispensing modification step comprises adjusting physical orientation of at least one nozzle member relative to an associated nozzle member, the adjustment correlative to the analysis of the at least one physical characteristic of the investigational topographic feature of the test shape.

11. The method of claim 10 wherein the nozzle members are contained on associated cartridges, the cartridges received in a corresponding carriage contained in the dispensing unit, the method further comprising the steps of:
adjusting at least one datum surface located on the cartridge, the adjusting step defined by analysis of the at least one physical characteristic of the three-dimensional test shape.

12. A method for producing a solid free form article comprising the steps of:
dispensing fluidizable material from a dispensing unit onto a receiving surface in a targeted iterative process to produce a three-dimensional test shape, having at least one investigational topographic feature defined thereon, wherein the dispensing unit is a drop on demand device having multiple nozzle members, the nozzle members are in communication with at least two sources of fluidizable material to be dispensed for integration into the solid free form article;
analyzing at least one physical characteristic present in the investigational topographic region, the physical characteristic correlative with targeting accuracy of the dispensing unit;
modifying dispensing of fluidizable material based on the analyzing step;
obtaining data regarding at least one dispensing characteristic of at least one material present in the investigational topographic three-dimension geometric test shape, the dispensing characteristic including at least one of portion size, portion geometry and dispensing timing; and
adjusting the dispensing characteristic relative to data obtained by analysis of the at least one physical characteristic of the investigational topographic feature of the three-dimensional test shape.

13. The method of claim 12 wherein data obtained by analysis of the three-dimensional test shape includes alignment offset between material dispensed from at least two nozzle members.

14. The method of claim 12 wherein the dispensing characteristic adjusted relative to data obtained by analysis of a physical characteristic of the investigational topographic feature of the three-dimensional geometric test shape is dispensing timing of the fluidizable material from at least one nozzle member.

15. A method for producing a solid free form article, comprising the steps of:
dispensing fluidizable material from a dispensing unit onto a receiving surface in a targeted iterative process to produce a three-dimensional test shape, having at least one investigational topographic feature defined thereon;
analyzing at least one physical characteristic present in the investigational topographic region, the physical characteristic correlative with targeting accuracy of the dispensing unit, wherein the at least one physical characteristic is color hue shift; and
modifying dispensing of fluidizable material based on the analyzing step;
wherein the three-dimensional geometric test shape is a solid comprising a central body having an outer surface, the investigational topographic feature projecting outward from the outer surface of the central body, the investigational topographic feature configured as at least one of a hemispheric dome or a pyramid.

16. The method of claim 15 wherein the three-dimensional test shape has at least one other investigational topographic feature defined therein, the at least one other investigational topographic feature of the three-dimensional geometric test shape having at least one continuous contoured surface extending inward from the outer surface of the central body.

17. The method of claim 16 wherein the at least one other investigational topographic feature of the three-dimensional geometric test shape is configured as at least one of a hemispheric dome, a pyramid, and a rectilinear configuration.

18. A method for producing a solid free form article, comprising the steps of:
dispensing fluidizable material onto a receiving surface from a dispensing unit having at least two nozzle members, the fluidizable material dispensed in a manner sufficient to produce a three-dimensional geometric test shape having a central body and an investigational topographic feature defined thereon;
analyzing at least one physical characteristic of the investigational topographic region, the physical characteristic including at least one of color hue shift, dimensional accuracy and surface integrity; and
modifying fluid dispensing from at least one nozzle member based on data produced in the analyzing step to produce at least one solid free form article separate from the geometric test shape.

19. The method of claim 18 wherein the investigational topographic feature of the three-dimensional geometric test shape has at least one contour surface.

20. A method for producing a solid free form article, comprising the steps of:
dispensing fluidizable material onto a receiving surface from a dispensing unit having at least two nozzle members, the fluidizable material dispensed in a manner sufficient to produce a three-dimensional geometric test shape having a central body and an investigational topographic feature defined thereon;
analyzing at least one physical characteristic of the investigational topographic region, the physical characteristic including at least one of color hue shift, dimensional accuracy and surface integrity; and
modifying fluid dispensing from at least one nozzle member based on data produced in the analyzing step to produce at least one solid free form article separate from the geometric test shape;
wherein the investigational topographic feature of the three-dimensional geometric test shape has at least one contour surface;
and wherein the contour surface has at least one curvilinear region configured to facilitate detection of at least one of color hue shift, surface irregularity and dimensional inaccuracy.

21. The method of claim 20 wherein the three-dimensional test shape is a geometric solid.

22. The method of claim 21 wherein the investigational topographic feature of the geometric three-dimensional geometric test shape projects outward from the central body.

23. The method of claim 21 wherein the investigational topographic feature of the geometric test shape is at least one of a hemispheric dome, a pyramid, or a rectilinear configuration.

24. The method of claim 23 further comprising the steps of:
obtaining data regarding at least one dispensing characteristic of the portion of the material dispensed from at least one nozzle member, the dispensing characteristic including at least one of portion size, portion geometry and dispensing timing; and
adjusting the dispensing characteristic relative to data obtained by analysis of at least one physical characteristic of the investigational topographic feature of the three-dimensional geometric test shape.

25. A device for producing a solid free form article, the device comprising:
a fluid dispensing device having at least two nozzle members and a control mechanism controlling emissions from the nozzle members in a predetermined logical sequence, the predetermined logical sequence sufficient to produce at least one three-dimensional geometric test shape having at least one investigational topographic feature; and
an analytical device associated with the fluid dispenser, the analytical device capable of analyzing at least one physical characteristic of the investigational topographic region of the three-dimensional geometric test shape;
wherein in response to analysis of the at least one physical characteristic, at least one of the at least two nozzle members is capable of having its physical orientation adjusted relative to that of an other of the at least two nozzle members.

26. The device of claim 25 further comprising a controller actionable on the fluid dispensing device.

27. The device of claim 26 further comprising a controller for adjusting targeting of at least one nozzle member in response to output derived from at least one analytical device.

28. The device of claim 25 wherein the physical characteristic analyzed includes at least one of color hue shift, dimensional accuracy, and surface pattern irregularity.

29. A solid free form object having a physical characteristic including color hue shift stability, the solid free form object produced by a process which comprises the steps of:
analyzing at least one physical characteristic of at least one investigational topographic feature of a three-dimensional geometric test shape produced by dispensing fluidizable material from at least two nozzle members, the physical characteristic including color hue shift;
modifying dispensing from at least one nozzle member, the modification step governed by physical characteristic analysis;
producing at least one solid free form object subsequent to the modification step;
obtaining data regarding a dispensing characteristic of the portion of the material dispensed from at least one nozzle member, the characteristic including at least one of portion size, portion geometry, dispensing timing and dispensing trajectory; and
adjusting the portion dispensing characteristic relative to data obtained by analysis of at least one physical characteristic of the investigational topographic feature of the three-dimensional geometric shape;
wherein the at least two nozzle members are contained on at least one cartridge body, the at least two nozzle members in communication with at least two different fluidizable materials.

30. The solid free form object produced by the process of claim 29 wherein data obtained by analysis of at least one physical characteristic of the investigational topographic feature of the three-dimensional test shape includes alignment offset between material dispensed from at least two of the multiple nozzle members.

31. A method for aligning multiple nozzle members in a dispensing device in a solid free form fabrication tool, the method comprising:

analyzing at least one physical characteristic of a three-dimensional geometric test shape having at least one investigational topographic feature, the geometric test shape produced by dispensing at least one fluidizable material from at least two noble members;

correlating the data derived in the analysis step with known physical standards to ascertain offset data; and employing the offset data to adjust a physical orientation of at least one of the at least two nozzle members relative to an other of the at least two nozzle members.

32. The method of claim 31 wherein the physical characteristic includes at least one of color hue shift, surface pattern irregularity, and dimensional accuracy.

33. The method of claim 31 wherein the three-dimensional test shape is a geometric solid having a base and at least one investigational topographic feature projecting from the base, the investigational topographic feature having at least one continuous contour surface.

34. A device for producing a solid free form article, the device comprising:

means for dispensing solid free form fabrication fluid, the dispensing means having at least two dispensing members and means for controlling emissions from the dispensing members to form a three-dimensional geometric test shape;

means for analyzing at least one physical characteristic of the three-dimensional test shape produced by action of the dispensing means, wherein the at least one physical characteristic is color hue shift; and means for adjusting at least one aspect of the dispensing members based on analysis developed by the analyzing means.

35. The device of claim 34, further comprising means for initiating production of solid free form articles subsequent to dispensing member adjustment based on the three-dimensional geometric test shape.

36. The device of claim 34 wherein the three-dimensional geometric test shape includes a central body and at least one investigational topographic feature defined thereon.

37. A device for producing a solid free form article, the device comprising:

means for dispensing solid free form fabrication fluid, the dispensing means having at least two dispensing members and means for controlling emissions from the dispensing members to form a three-dimensional geometric test shape having an investigational topographical feature defined thereon;

means for analyzing at least one physical characteristic of the three-dimensional test shape produced by action of the dispensing means, wherein the at least one physical characteristic is color hue shift; and means for adjusting at least one aspect of the dispensing members based on analysis developed by the analyzing means;

wherein the investigational topographic feature is configured as a three-dimensional geometric solid selected from a hemispheric dome and a pyramid, and projects outwardly from a central body.

38. The device of claim 37 wherein the at least two dispensing members are contained in at least one removable cartridge.

39. A method for producing a solid free form article, comprising the steps of:

dispensing fluidizable material from a dispensing unit onto a receiving surface in a targeted iterative process to produce a three-dimensional test shape, having at least one investigational topographic feature defined therein;

analyzing at least one physical characteristic present in the investigational topographic region, the physical characteristic correlative with targeting accuracy of the dispensing unit, wherein the at least one physical characteristic is color hue shift; and modifying dispensing of fluidizable material based on the analyzing step;

wherein the three-dimensional geometric test shape is a solid comprising a central body having an outer surface, the investigational topographic feature projecting inward from the outer surface of the central body.

* * * * *

UNITED STATES PATENT AND TRADEMARK OFFICE
CERTIFICATE OF CORRECTION

| | | |
|---|---|---|
| PATENT NO. | : 7,229,144 B2 | |
| APPLICATION NO. | : 10/285724 | |
| DATED | : June 12, 2007 | |
| INVENTOR(S) | : Jeffrey Allen Nielsen et al. | |

It is certified that error appears in the above-identified patent and that said Letters Patent is hereby corrected as shown below:

In column 17, line 8, in Claim 31, delete "noble" and insert -- nozzle --, therefor.

Signed and Sealed this

Twelfth Day of May, 2009

JOHN DOLL
*Acting Director of the United States Patent and Trademark Office*